United States Patent
Borrelli et al.

(10) Patent No.: US 6,796,148 B1
(45) Date of Patent: Sep. 28, 2004

(54) DEEP UV LASER INTERNALLY INDUCED DENSIFICATION IN SILICA GLASSES

(75) Inventors: Nicholas F. Borrelli, Elmira, NY (US); Douglas C. Allan, Corning, NY (US); Charlene M. Smith, Corning, NY (US)

(73) Assignee: Corning Incorporated, Corning, NY (US)

( * ) Notice: Subject to any disclaimer, the term of this patent is extended or adjusted under 35 U.S.C. 154(b) by 11 days.

(21) Appl. No.: 09/675,721

(22) Filed: Jan. 10, 2001

Related U.S. Application Data

(60) Provisional application No. 60/156,737, filed on Sep. 30, 1999.

(51) Int. Cl.[7] ............................................. C03B 37/027
(52) U.S. Cl. ........................... 65/386; 65/392; 430/321; 430/290
(58) Field of Search ................. 65/390, 386; 430/321, 430/290

(56) References Cited

U.S. PATENT DOCUMENTS

| | | | |
|---|---|---|---|
| 4,090,776 A | 5/1978 | Bernal et al. ............. 350/96.12 |
| 4,145,457 A | 3/1979 | Kersten ........................ 427/38 |
| 4,641,924 A | 2/1987 | Nagae et al. | |
| 4,710,605 A | 12/1987 | Presby ........................ 219/121 |
| 4,847,138 A | 7/1989 | Boylan et al. | |
| 5,157,674 A | 10/1992 | Lawandy ...................... 372/68 |
| 5,232,879 A | 8/1993 | Hoaglin et al. ................ 501/41 |
| 5,235,659 A | * 8/1993 | Atkins et al. ................. 385/124 |
| 5,235,662 A | 8/1993 | Prince et al. ................ 385/129 |
| 5,253,198 A | 10/1993 | Birge et al. .................. 365/106 |
| 5,285,517 A | 2/1994 | Wu ............................. 385/142 |
| 5,287,427 A | * 2/1994 | Atkins et al. ................. 385/124 |
| 5,289,407 A | 2/1994 | Strickler et al. ............. 365/106 |
| 5,325,324 A | 6/1994 | Rentzepis et al. ........... 365/127 |
| 5,500,031 A | * 3/1996 | Atkins et al. .................. 65/386 |
| 5,616,159 A | 4/1997 | Araujo et al. ................. 65/17.4 |
| 5,620,496 A | 4/1997 | Erdogan et al. ............... 65/425 |
| 5,634,955 A | 6/1997 | Araujo et al. | |
| 5,656,186 A | 8/1997 | Mourou et al. ........ 219/121.69 |
| 5,761,111 A | 6/1998 | Glezer ........................ 365/106 |
| 5,773,486 A | 6/1998 | Chandross et al. ........... 522/33 |
| 5,840,118 A | 11/1998 | Yamazaki .................... 117/103 |

(List continued on next page.)

FOREIGN PATENT DOCUMENTS

| | | | | |
|---|---|---|---|---|
| EP | 0797112 | * | 9/1997 | |
| EP | 0 569 182 B1 | | 12/1997 | ............ G02B/6/16 |
| JP | 10288799 | | 10/1998 | |
| JP | 11-167036 | | 6/1999 | |
| WO | 93/16403 | | 8/1993 | ............ G02B/6/12 |
| WO | 97/32821 | | 9/1997 | ........... G03B/20/00 |
| WO | WO99/41625 | * | 2/1999 | |
| WO | WO-0109899 A1 | | 2/2001 | ........... G11C/13/04 |
| WO | WO-0144871 A1 | | 6/2001 | ............ G03C/5/00 |

OTHER PUBLICATIONS

N. F. Borrelli, C. M. Smith and D. C. Allan, Excimer–laser–induced densification in binary silica glasses, Optics Letters, Oct. 15, 1999/vol. 24, No. 20, pp. 25–27.

(List continued on next page.)

*Primary Examiner*—John Hoffmann
(74) *Attorney, Agent, or Firm*—Timothy M. Schaeberle; James V. Suggs

(57) ABSTRACT

A method of writing a light guiding structure in a bulk glass substrate including selecting a bulk glass substrate made from a soft silica-based material; and focusing an excimer laser beam at a focus within said substrate while translating the focus relative to the substrate along a scan path at a scan speed effective to induce an increase in the refractive index of the material along the scan path relative to that of the unexposed material while incurring substantially no laser induced breakdown of the material along the scan path. Various optical devices, including waveguides can be made in this way.

22 Claims, 11 Drawing Sheets

U.S. PATENT DOCUMENTS

| | | | | |
|---|---|---|---|---|
| 5,841,928 A | * | 11/1998 | Maxwell et al. | 385/129 |
| 5,881,186 A | | 3/1999 | Starodubov | 385/37 |
| 5,910,371 A | | 6/1999 | Francel et al. | 428/428 |
| 5,919,607 A | | 7/1999 | Lawandy | 430/326 |
| 5,978,538 A | | 11/1999 | Miura et al. | 385/123 |
| 5,999,672 A | * | 12/1999 | Hunter et al. | 385/37 |
| 6,009,222 A | | 12/1999 | Dong et al. | 385/127 |
| 6,075,625 A | | 6/2000 | Ainslie et al. | 359/3 |
| 6,154,593 A | | 11/2000 | Miura et al. | 385/123 |
| 6,178,281 B1 | * | 1/2001 | Sautter et al. | 385/129 |
| 6,192,712 B1 | * | 2/2001 | Saito et al. | 65/386 |
| 6,209,356 B1 | * | 4/2001 | Cocito et al. | 65/392 |
| 6,220,055 B1 | | 4/2001 | Francel et al. | 65/60.5 |
| 6,226,433 B1 | * | 5/2001 | Weber | 385/129 |
| 6,238,847 B1 | | 5/2001 | Axtell, III et al. | 430/322 |
| 6,284,685 B1 | * | 9/2001 | Borrelli et al. | 501/45 |
| 6,322,958 B1 | | 11/2001 | Hayashi | 430/495 |
| 6,411,765 B1 | * | 6/2002 | Ono | 385/131 |
| 6,640,039 B1 | * | 10/2003 | Miura et al. | 385/129 |
| 2001/0035339 A1 | * | 11/2001 | Sugioka et al. | 204/157.15 |

OTHER PUBLICATIONS

K. Miura, Jianrong Qui, H. Inouye and T. Mitsuyu, K. Hirao, Photowritten optical waveguides in various glasses with ultrashort pulse laser, Appl. Phys. Lett., vol. 71, No. 23, Dec. 8, 1997, pp. 3329–3331.

N. F. Borrelli, Charlene Smith, Douglas C. Allan and T.P. Seward III, Denisifcation of fused silica under 193–nm excitation, J. Opt. Soc. Am. B/vol. 14, No. 7/Jul. 1997, pp. 1606–1615.

HPFS® Standard Grade, www.hpfs.corning.com, Corning Incorporated, May 1999.

HPFS® ArF Grade, www.hpfs.corning.com, Corning Incorporated, May 1999.

HPFS® KrF Grade, www.hpfs.corning.com, Corning Incorporated, May 1999.

Indigo—DUV, Positive Light, www.poslight.com, May 2000.

Custom Lasers, Positive Light, www.poslight, Oct. 1999.

Indigo–SLM, Positive Light, www.poslight, Oct. 1999.

Positive Light New Products, www.poslight.com, Sep. 21, 2000.

Coherent, Innova Sabre FRED Technical Data, Frequency–Doubled Ion Laser System, copyright 1996.

Coherent—Laser Applications—Lithography, www.coherentinc.com, Sep. 21, 2000.

Coherent—Products—Lasers—Ion—Innova FRED, www.coherentinc.com, Sep. 21, 2000.

CYMER® Cymer—Products: Background, www.cymer.com, Sep. 21, 2000.

CYMER® Cymer—Products: 248 nm KrF Product Family, www.cymer.com, Sep. 21, 2000.

CYMER® Cymer—Products: 193 nm ArF Product Family, www.cymer.com, Sep. 21, 2000.

USSN 09/627,868, filed Jul. 28, 2000, Borrelli et al., entitled Direct Writing of Optical Devices in Silica–Based glass Using Femtosecond Pulse Lasers, pp. 1–46.

USSN 09/928,666, filed Jul. 28, 2000, Aitken et al., entitled Femotosecond Laser Writing of Glass, Including Borosilicate, Sulfide, and Lead Glasses, pp. 1–43.

Kondo, Y, Suzuki, T. Inouye, H. Miura, K, Mitsuyu, T. & Hirao, K., Three–dimensional microscopic crystallization in photosensitive glass by femtosecond laser pulses at non-resonant wavelength, Journal of Applied Physics, Part 2 (Letters), vol. 37, No. 1A–B, p. L94–6.

Yuki Kondo, Kentaro Nouchi and Tsuneo Mitsuyu, Fabrication of long–period fiber gratings by focused irradiation of infrared femtosecond laser pulses, Optics Letters/vol. 24, No. 10/May 15, 1999, pp. 646–648.

K. Hirao and K. Miura, Technical Digest International Workshop on Structure and Functional Optical Properties of Silica and Silica–related Glasses, Writing waveguides in Silica–related Glasses with Femtosecond Laser, Jul. 10–11, 1997, pp. 103–105.

K. M. Davis, K. Miura, N. Sugimoto and K. Hirao, Writing waveguides in glass with a femtosecond laser, Optics Letters, Nov. 1, 1996/vol. 21, No. 21, pp. 1729–1731.

Svalgaard et al., "Direct UV Writing of Buried Singlemode Channel Waveguides in Gedoped Silica Films", Electronics Letter, 18th Aug. 1994, vol. 30, No. 17, pp. 1401–1403.

Svalgaard, M. "Direct Writing of Planar Waveguide Power Splitters and Directional Couplers Using a Focused Ultravoilet Laser Beam", Electronics Letters, Sep. 25th 1997, vol. 33, No. 22, 2 pages total.

* cited by examiner

DEEP UV LASER INTERNALLY INDUCED DENSIFICATION IN SILICA GLASSES

This application claims priority from, and incorporates by reference herein, provisional U.S. patent application Ser. No. 60/156,737 filed Sep. 30, 1999.

BACKGROUND OF THE INVENTION

The present invention relates to methods for efficiently forming optical devices in glass utilizing deep UV light (<300nm). Specifically, the invention relates to direct-write methods of forming light guiding structures in glass compositions through light-induced refractive index changes. The invention also relates to the optical devices made by the direct-write methods. The invention also relates to bulk glass substrate bodies in which densified waveguides can be directly and efficiently written.

Optical devices such as optical waveguides and Bragg diffraction gratings are widely known in the telecommunications field. In an optical waveguide, a higher refractive index core surrounded by a lower refractive index cladding guides light and can transmit a large amount of optical information over long distances with little signal attenuation. The optical waveguide fiber is the prototype device of this type. The fiber is produced by a method that, by virtue of its fabrication from different material core glasses and different material cladding glass with high and low refractive indexes, gives the proper waveguiding structure. A Bragg grating is another type of an optical device that can be used to filter and isolate a narrow band of wavelengths from a broader signal. The most common materials used commercially in telecommunications applications of light guiding devices are doped silica-based compositions such as germania doped silica core and pure dry hydroxyl-free silica clad.

It is known that laser sources can be used to effect both index changes and to produce physical damage in glass. With regard to the former, the use of a pulsed UV radiation laser source for writing Bragg gratings in germania doped silica core fibers is known. Recently, a "direct-write" laser method of forming optical waveguides within a glass volume that is transparent to the wavelength of a femtosecond laser has been disclosed. In this method, a 120 fs$\leq$pulsed 810-nm laser is focused within a polished piece of silica as the glass is translated perpendicular to the incident beam through the focus. Increases in refractive index on the order of $10^{-2}$ were reported for a specific condition in which the focus was scanned ten times over the exposed area.

One potential problem with a direct write process of forming waveguides in bulk glass using short-pulse focused lasers is over-exposure. Irradiation with too much energy can lead to physical damage in the glass. Physical damage and break down of the glass results in undesired attenuation of optical signals transmitted through the glass.

Another problem in direct write methods of making optical structures relates to the trade-off between the dimensional stability of the writing device, e.g., the laser, and the energy necessary to induce the desired refractive index change in the substrate material.

To make the laser direct-write method industrially practical, changes in the refractive index of a material must be achieved in a reasonable amount of writing time. There continues to be a need for a practical direct write method of creating silica-based optical devices having a sufficiently increase refractive index at an acceptably high write rate. Such a method could be used to write continuous light-guiding waveguide patterns connecting any two points within a continuous block of a suitable material, or make other optical devices, such as Bragg gratings.

Silica-germania is often used as a material whose index can be altered with light. In the photosensitive response of germania doped silica, $H_2$-loading is typically employed as a method to increase the response of the glass. In that situation, the mechanism of index increase is by color center formation mechanism, through the Kramer-Kronig relationship. The use of $H_2$-loading introduces logistical issues, including time required to load with $H_2$. for bulk materials, in particular, the time to impregnate $H_2$ at a temperature low enough that the $H_2$ does not react with the material, becomes prohibitively long. For example, a 3-mm thick piece of a silicate glass takes 36 days to load at 150° C. Once having gotten the $H_2$ into the material, the storage of pieces containing $H_2$ becomes an issue, although for bulk material this is less of an issue.

The increase in refractive index through densification offers advantages in material handling in that $H_2$ loading is not necessary. Hydrogen loading may be practical for small dimensional glass structures such as optical fibers and thin planar layers where hydrogen can be readily diffused in, it is impractical for three dimensional addressing and writing in the interior of larger glass bodies because of the problems and difficulties in diffusing the hydrogen deep inside the glass body interior and absorption properties of the glasses. Another potential advantage of the invention is that thermal stability of a feature written using $H_2$-loaded silica-germania typically undergo a thermal anneal at low temperature, during which the grating is "fixed." This thermal anneal decreases the efficiency of the grating by about 30% but helps to insure that further changes in efficiency are minimized. The inventive utilization of the densification mechanism yields a feature that needs no thermal treatment for "fixing" and is generally more thermally robust in that features remain in the piece even at several hundred degrees, while providing writing deep into the interior of glass bodies that have depths from their surface that can be greater than 2 cm.

It is known that sustained high-energy radiation and laser exposure of high purity fused silica such as with excimer laser microlithography systems where laser beam exposure can produce a measurable densification effect in fused silica optical elements.

SUMMARY OF THE INVENTION

It is an object of the invention to provide improved direct-write methods of forming light guiding structures within a silica-based material substrate. In particular, it is desired to internally and efficiently write three-dimensional light guiding structures in glass, such as waveguides and gratings. A focussed deep UV (<300 nm) laser beam is translated through the interior of a large dimension glass body to form densified glass waveguiding core structures through the glass interior with the densified glass waveguiding core structures able to traverse the glass body in three dimensions in multiple directions, through multiple planes and to multiple exterior surfaces of the glass body.

The inventive method includes internal direct write densification formation of waveguide cores within large glass bodies that have depths from the glass surface to the glass body interior of at least 1 cm, preferably at least 2 cm, preferably at least 3 cm, and most preferably at least 4 cm. The invention includes making optical waveguide devices in three dimensional glass bodies with direct written densified waveguide cores with interior non-surface corepath parts that are at least 1 cm, preferably at least 2 cm, preferably at least 3 cm, and most preferably at least 4 cm away from the exterior surfaces of the glass body.

It is a further object of the invention to provide method of writing optical structures in silica-based materials.

In accordance with one aspect of the invention, it has been discovered that soft silica-based materials exhibit increased sensitivity to laser writing of optical structures in the bulk.

In accordance with another aspect of the invention, a method is provided to directly write light guiding structures in glass using lasers with substantially no physical damage of the glass.

In accordance with another aspect of the invention, a method is provided to write three dimensional optical structures in silica-based bulk glass. Specifically, the invention provides for translating the refractive index-increasing focus of a laser through a silica-based substrate in the x, y, and z-dimensions.

In accordance with still another aspect of the invention, a variety of optical devices are disclosed which incorporate optical structures made by the methods described herein. The invention includes selectively densifying traced internal volume regions within a larger bulk volume of a soft (annealing point<1350° K) silica glass with a <300 nm deep UV laser beam focus to form densified optical waveguide core tunnels.

These and other aspects of the invention will become apparent to those skilled in the art in light of this disclosure.

DETAILED DESCRIPTION OF THE INVENTION

The direct-write method of forming light guiding structures in a soft silica glass bulk substrate according to the invention includes the steps of selecting a substrate made from a silica-based material in which the light guiding structure is to the written, focusing a $\leq 300$ nm UV laser beam to a focus at an internal position within the substrate effective to densify the focused-on material and translating the substrate and focus with respect to one another to form a scanned path light guiding structure within the substrate along the densified glass scan path. The $\lambda \leq 300$ nm laser beam selectively densified scan path within the glass body has an increased refractive index that is cladded by the surrounding lower original refractive index of the un-densified glass that has not been focused-on. The densifying of the glass is preferentially produced through two-photon absorption and is dependent on the square of the intensity of the focused laser beam.

Focusing of the laser beam significantly increases the peak intensity of the beam compared to an unfocused beam. The high intensity of the focused beam densifies the glass and induces an increase in the refractive index of the glass along the densified glass path traced by the beam focus as it is translated through the silica glass sample. The resulting path region of increased refractive index densified glass can guide light and therefore can function as an optical waveguide path cladded by its surrounding undensified neighbor glass.

Figure 1A:
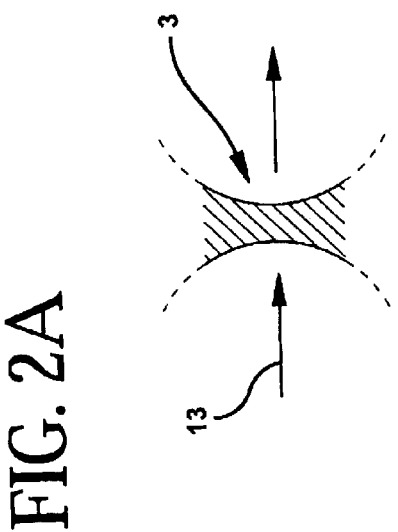
FIG. 1(A) and FIG. 1(B) show the positioning of the incident laser beam relative to the scan direction in the top-write and axial-write orientations, respectively.
Figure 1B:
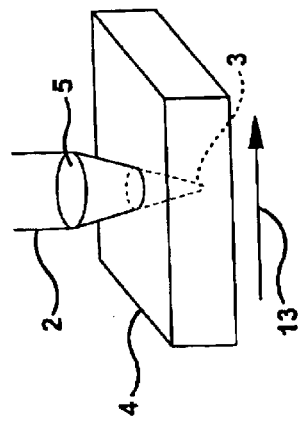
Figure 2A:
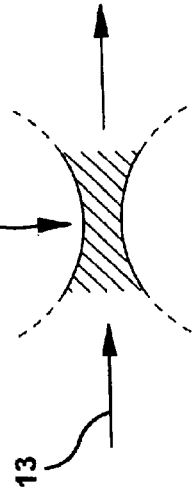
FIG. 2(A) and FIG. 2(B) show the scanning beam profile and a waveguides cross-sectional shape in the top-write and axial orientations, respectively.
Figure 2B:
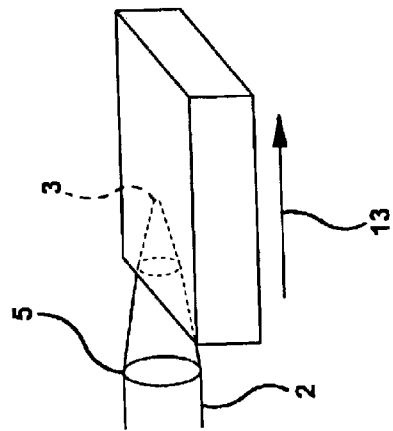

A "top densification writing" method results from translating the sample in a direction 13 that is substantially perpendicular to the densifying incident beam, as shown in FIG. 1(A). An "axial writing" method results from translating the sample in a scan direction 13 that is substantially parallel to the incident beam, as shown in FIG. 1(B). As the skilled artisan will readily appreciate, top-writing may also be accomplished by translating the sample in just the x-direction, just the y-direction, or both the x-direction and y-direction simultaneously.

When the top-write focus is translated through the sample in the scan direction, a generally ellipsoid a cross-section of the waveguide may be formed. When the axial-write focus is translated through the sample in the scan direction, a generally circular cross-section of the waveguide often results. Accordingly, axially-written waveguides are generally preferred in order to produce waveguides having substantially circular cross-sections. Top-writing may be desired in order to write continuous linear waveguides longer than the focal length of the focusing lens.

Figure 3A:
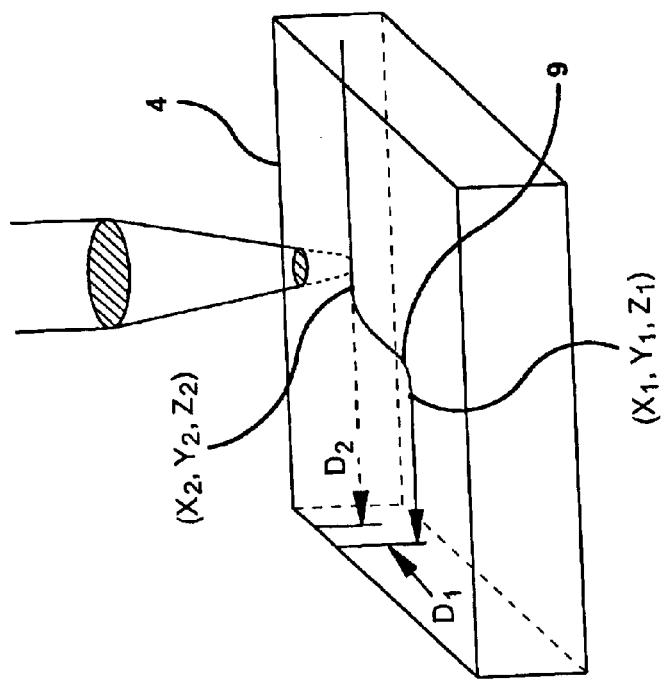
FIG. 3(A) and FIG. 3(B) are perspective views of the top-write arrangement of directly writing three dimensional optical devices in bulk glass.
Figure 3B:
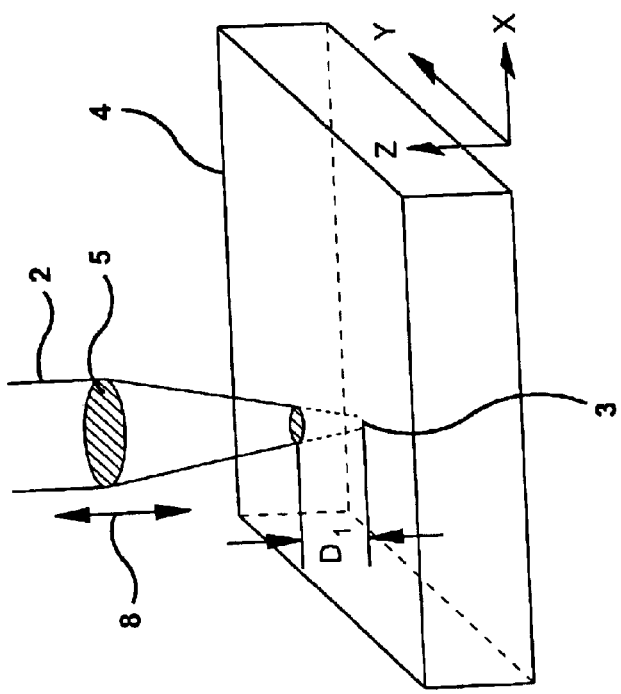

The ability to write three-dimensional waveguides in a sample using the present direct-write method is described further with reference to FIGS. 3(A) and 3(B). The laser beam 2 can be focused by a lens 5 to a focus 3 positioned within glass sample 4. Translation of the sample in the x-, y-, and z-directions from a first position ($x_1$, $y_1$, $z_1$) at depth $D_1$ to a second position ($x_2$, $y_2$, $Z_2$) at a depth $D_2$ causes an increase in the refractive index of the glass along the scan path 9 to form an optical waveguide path extending in three dimensions between the fist and second positions within the sample. If planar, i.e., two-dimensional, waveguides are desired, $x_1$ may be the same as $x_2$, $y_1$ may be the same as $y_2$ or $z_1$ may be the same as $z_2$. If linear waveguides are desired, $x_1$ and $y_1$ may be the same as $x_2$ and $y_2$, respectively, $y_1$ and $z_1$ may be the same as $y_2$ and $z_2$, respectively, or $x_1$ and $z_1$ may be the same as $x_2$ and $z_2$, respectively.

The laser can be any device capable of generating an appropriate powerful UV $\lambda$<300-nm laser beam. Examples of useful lasers are described in the examples that follow. The UV $\lambda$<300 nm laser beam is characterized by several beam parameters. In a preferred embodiment an excimer laser is used. The laser used preferably has a pulse duration greater than 5 nanoseconds. Excimer lasers are pulsed sources with pulse duration between 15 and 60 nsec. The unfocused pulse energy per pulse fluences of the excimer laser for the application can be in the range of 2 to 100 mJ/cm² with this pulse fluence increased by focusing of the laser beam. Preferably an excimer laser with a wavelength less than 300 nm is utilized such as a KrF or ArF excimer laser. In addition to excimer laser sources, the densifying laser can be non-excimer lasers which produce below 300 nm wavelength and appropriate intensities. Alternatives to excimer laser sources include solid state lasers, such as Nd YAG and YLF, Ti sapphire based solid state lasers. The UV $\lambda<300$ nm laser beam intensity and profile preferably provides by focusing (preferably with a lens) a glass densifying focus with focused intensity $\geq 10$ mJ/cm² when measured at a 10 micron beam diameter. Preferably the glass densifying focus has an intensity $\geq 50$ mJ/cm² and most preferably $\geq 100$ mJ/cm² at a measured 10 micron beam diameter. An appropriate UV $\lambda<300$ nm laser used to internally densify the soft silica glass material has a focusable laser beam output with a densifying fluence which is focusable to a glass densifying focus with a large dimensions of about 10 microns (10±5 microns) and an intensity in the range from 10 mJ to 150 mJ/cm². Such a $\lambda<300$ mm glass densifying focus is utilized to internally densify write areas in the glass with the bulk glass having an internal transmission at the below 300 nm $\lambda$ that is >70%/cm, preferably >90%/cm, preferably >95%/cm and most preferably $\geq 98$%/cm. Preferably with the invention when germania doped silica is the soft silica bulk glass substrate written in with the focus, the focussed deep UV laser beam wavelengths are above 220 nm, and preferably in the range of about 220 nm to 250 nm. Preferably with the invention when germnania-free silica is the soft silica bulk glass substrate (undoped high purity fused silica or doped with nongermania softening dopants) written in with the focus, the focussed deep UV laser beam wavelengths are above 180 nm, and preferably in the range of about 180 nm to 220 nm. Preferably the glass densifying focus has an intensity which efficiently densifies the glass but is not so intense that voids are formed in the focus exposed glass. Such a densifying focus less than a high intensity micro-channeling avoids physical damage to the glass and inhibits laser induced break down of the glass such as evidenced by void formation.

While the examples below refer to moving the glass sample with respect to a fixed glass densifying focus, the skilled artisan will readily appreciate that alternatively the glass densifying laser focus could be moved relative to a fixed sample, or both the densifying laser focus and sample could be moved simultaneously with respect to a fixed reference point to achieve the desired relative translation speed between the sample and the pattern forming focus. Preferably translating the focus relative to the substrate along a scan path at a scan speed effective to induce an increase in the density of the material along the scan path relative to that of the unexposed material while incurring substantially no laser induced breakdown of the material along the scan path includes using a scan speed in the range of about 1 micron to 1 mm per second.

While the drawings have depicted the glass substrate writable silica material samples suitable for use in the present invention as having substantially planar surfaces oriented at right angles to one another, the skilled artisan will recognize that the invention is not limited to such regular solid substrate geometries. Rather, the invention can be used to direct-write optical waveguides in virtually any regular-or irregular-shaped three-dimensional sample. It is preferred, however, that the sample be positioned relative to the incident laser beam such that the beam is substantially perpendicular to the surface of the sample through which the incident beam passes. Preferably the substrate is a three-dimensional shape compared to a thin film layer. Preferably the substrate has a thickness that is several times thicker than the path thickness, preferably at least hundred times, more preferably at least five hundred times, and most preferably at least 1,000 times.

The composition of the substrates in which the light guiding structures may be 30 written by the invention are silica-based materials, including undoped fused silica and doped binary and ternary silica systems. Silica-based materials are preferred in light of their various desirable optical properties as well as their widespread use in telecommunication device applications. Binary and ternary silica systems are often preferred for use in the present invention. Binary and ternary silica based materials are preferred because of their enhanced sensitivity to densification.

By "silica-based materials", is meant glass compositions that include silica and which are essentially free of alkali, alkaline earth, and transition metal elements, as well as other impurities which would cause absorption in the 1300–1600 nm range. If present at all, such impurities will typically not be found in the silica-based materials used in this invention at levels higher than 10 ppb (parts per billion).

The present inventors have found, that generally, waveguides can be written more easily in bulk substrates made from soft silica-based compositions than in hard silica-based materials without sacrificing the magnitude of the induced index change. Soft silica-based compositions appear to be more sensitive to direct writing of light guiding structures using excimer lasers than hard silica-based composition glasses.

For the purposes of this disclosure, "soft" silica-based materials are defined as doped or undoped silica-based materials having an annealing point less than that of a germania doped glass composition of 5 mol. % $GeO_2$–95 mol. % $SiO_2$, i.e., and preferably the silica-based materials have an annealing point less than about 1380° K. The preferred silica-based glasses are undoped and doped binary or ternary silica-based materials having an annealing point less than about 1380° K, more preferably less than about 1350° K, and most preferably within the range of about 900° K to about 1325° K. The annealing point is defined as the temperature at which the viscosity of the material Undoped silica-based materials include, for example, commercial grade fused silica, such as Corning Incorporated's HPFS® type high purity fused silica 7980 glass, which can have an annealing point in the range of about 1261° K to about 1323° K. Preferably the soft high purity fused silica glass utilized in the invention is a non-dry high purity fused silica with an OH content >50 ppm by wt., more preferably >100 ppm, more preferably >200 ppm, and most preferably >500 ppm. As for the doped systems, the preferred dopants which may be used to soften silica include oxides of the elements boron, phosphorous, aluminum, and germanium, such as borate ($B_2O_3$), phosphate ($P_2O_5$), alumina ($Al_2O_3$), and germania ($GeO_2$), respectively. Any desired concentration of dopant can be used.

In binary boron-doped silica-based systems, the borate content may comprise up to 20 wt. % or more borate. Preferably the binary glass system is in the composition range from 9 wt. % $B_2O_3$–91 wt. % $SiO_2$ to 20 wt. % $B_2O_3$–80 wt. % $SiO_2$. The annealing point of the 9 wt. % $B_2O_3$–91 wt. % $SiO_2$ composition is about 1073° K. The annealing point of the 20 wt. % $B_2O_3$–80 wt. % $SiO_2$ composition is about 999° K.

In binary phosphorous-doped silica-based systems, the phosphate content may also comprise up to 20 wt. % or more phosphate, with a preferred range of about 7 to 20 wt. %. Preferably, the binary glass system is in the composition range from 10 wt. % $P_2O_5$–90 wt. % $SiO_2$ to 7 wt. % $P_2O_5$–93 wt. % $SiO_2$. The annealing point of the 7 wt. % $P_2O_5$–90 wt. % $SiO_2$ composition is about 1231° K.

In binary aluminum-doped silica-based systems, the alumina content comprise up to 20 wt. % or more alumina, with a preferred range of about 10 to 20 wt. %. For example, the binary glass systems 10 wt. % $Al_2O_3$–90 wt. % $SiO_2$ may be used.

In binary germanium-doped silica-based systems, the germania content may comprise up to about 22 wt. % or more germania, with a preferred range of about 15 to 25 wt. %. Preferably, the binary glass systems are in the composition range from 20 wt. % $GeO_2$–80 wt. % $SiO_2$ to 22 wt. % $GeO_2$–78 wt. % $SiO_2$ may be used. The annealing point of the 20 wt. % $GeO_2$–80 wt. % $SiO_2$ composition is about 1323° K while that of the 22 wt. % $GeO_2$–78 wt. % $SiO_2$ composition is about 1311° K. An alternative range contains from 14% to 9% germania. The binary composition range from 9% to 22% germania.

However, in the present invention, while germanium doped glasses can be used, it is not necessary to use germanium. Thus, the invention can be used in silica glass free of germanium. In a preferred embodiment the soft silica glass is substantially free of Ge.

"Hard" silica-based materials are defined as doped or undoped silica-based materials having an annealing point higher than that of the 5 mol. % $GeO_2$–95 mol. % $SiO_2$ glass system, i.e., higher than about 1380° K. Examples of hard silica-based materials include dry fused silica which has an annealing point of about 1425° K. As is generally known in the art, "dry" fused silica has virtually no residual hydroxyl groups, while commercial grade fused silica such as Corning HPFS® silica may have higher levels, for example, >200 ppm by wt. hydroxyl groups, and >800 ppm.

The silica-based materials used in this invention are preferably made by a flame hydrolysis process. In such a process, silicon-containing gas molecules are reacted in a flame to form $SiO_2$ soot particles. These particles are deposited on the hot surface of a rotating body that consolidate into a very viscous fluid which is later cooled to the glassy (solid) state. In the art, glass making procedures of this type are known as vapor phase hydrolysis/oxidation processes or simply as flame hydrolysis processes. However, other known processes can be used. In a preferred practice the silica based materials are produced by a single step direct deposition and consolidation process. In an alternative the glass is made by deposition and later consolidation.

Applicants have found that exposure of silica gasses to excimer laser radiation can induce a density change, termed densification, in the glass. Upon treatment with the laser, the glass is denser with a concomitant higher refractive index. Density change can be induced through exposure to, for example, 248 nm and 193 nm, excimer laser pulses. The pulse duration can be 5 to 30 nanoseconds, preferably 20–30 ns, while the un-focused pulse energy is at least 10–100 $mJ/cm^2$. The densification by a focused laser beam inside the glass substrate body is utilized to write patterns into the glass and form waveguiding paths.

Especially useful silica glasses to be exposed, are those discussed above that maintain a high degree of transparency, especially in the deep uv. This is because, for excimer exposure, the sample should be substantially transparent at least 70% to 90%/cm to the excimer laser wavelength. So that one can produce densification deep inside the glass. The preferred densification mechanism is a two photon process with the two photon absorption rate increasing with decreasing wavelength, the best soft silica glasses are those that transmit to the shortest wavelength.

Again, it has been found that the softer the glass, as determined by a lower Tg or any other measure of the viscosity versus temperature behavior, such as the annealing or softening temperature, the more sensitive the glass is to induced changes as manifested by refractive index.

Polished silica glass substrate bulk samples were exposed to excimer laser radiation through an aperture, with the experimental arrangement described in D. C. Allan, C. Smith, N. F. Borrelli, and T. P. Seward III, Opt. Lett. 21(24), 1960, (1996) and N. F. Borrelli, C. Smith, D. C. Allan, and T. P. Seward III, J. Opt. Soc. Am., B, 14, 1606, (1997), incorporated by reference herein.

The laser used for the 193 nm and 248 nm exposures was a Lumonics 600. The energy through the aperture was monitored with a Molectron thermal detector. The optical phase induced by the exposure was measured interferometrically using a ZYGO Mark-IV instrument. From the measured optical phase shift the "unconstrained" densification $\Delta p/p$ was obtained with the aid of a finite-element model. The use of unconstrained densification as the metric for the densification process takes into account the sample geometry and the spatial aspects of the exposure beam. The nature of the model and its utilization is fully explained in Allan, et al., SPIE Vol. 3578, 16 (1998), incorporated herein by reference. Briefly, the finite element model accounts for the elastic response of the glass when the exposed region shrinks under densification, and allows for integrating the photoelastic response of the exposed and unexposed regions.

The glasses in Table 1 were exposed to 193-nm excimer laser to induce densification. In Table 1, there is shown the unconstrained densification for an exposure of 10 $mJ/cm^2$ for $10^6$ pulses with a pulse duration of 30 ns. The value of the induced refractive index is obtained by multiplying the densification by roughly 0.4.

TABLE 1

Comparison of unconstrained compaction for 193 nm excimer exposure, 0.3 $MW/cm^2$, $10^6$ pulses $\Delta p/p (10^{-6})$

| | |
|---|---|
| $SiO_2$ (Corning Incorporated HPFS ® fused silica 7980) | 1.6 |
| 78% $SiO_2$, 22%-$GeO_2$ | 14 |
| 80% $SiO_2$, 20% $B_2O_3$ | 388 |

Figure 4:
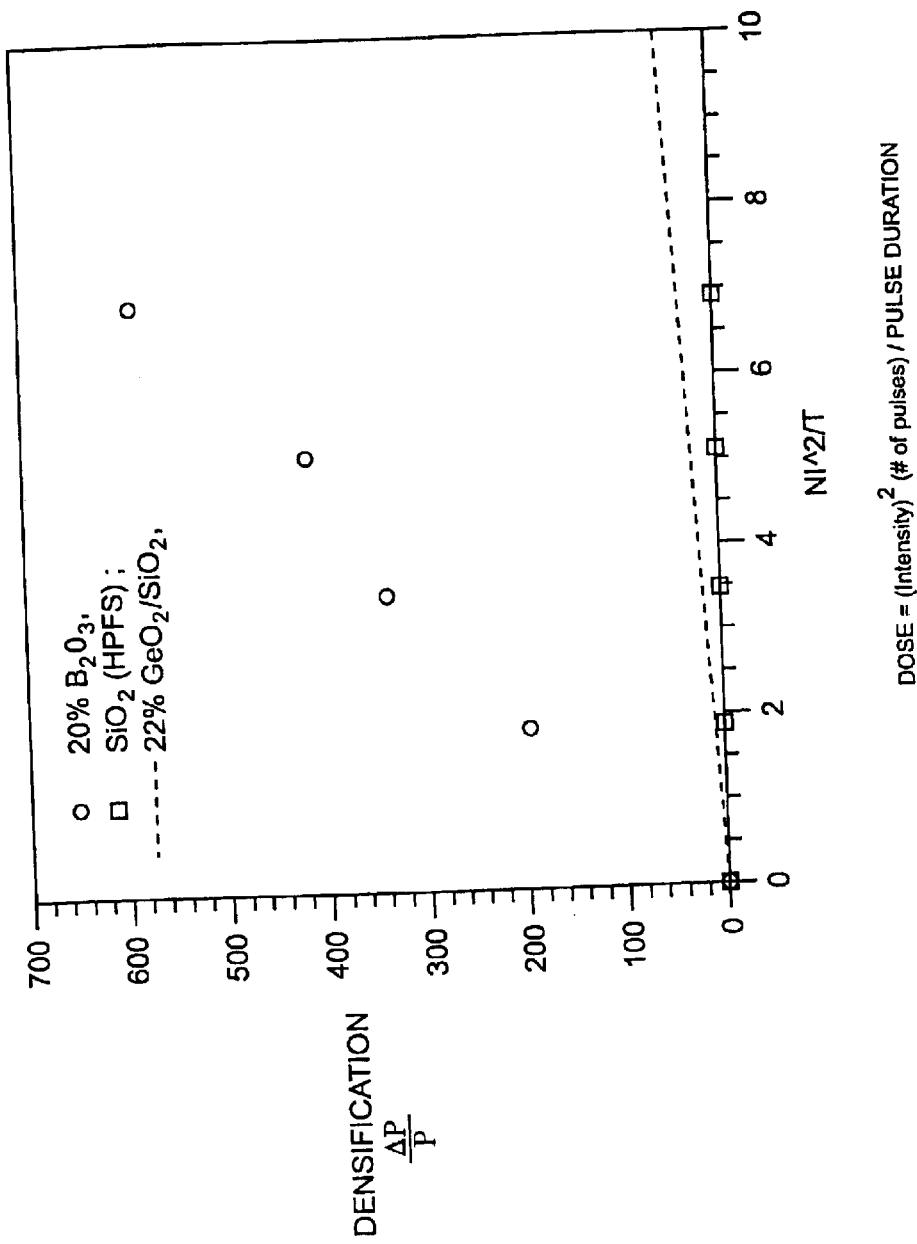
FIG. 4 shows densification as a function of exposure for glasses exposed to laser radiation (y-axis DENSIFICATION) (x-axis DOSE)

The actual development of the densification as a function of exposure is shown in FIG. 4 for the three samples. In FIG. 4 the x-axis is Dose and the y-axis densification. The progression of increased refractive index change from undoped silica to silica-germania to silica-boron for the excimer laser-induced refractive index change strongly suggests the softness of the glass as a key parameter in the amount of index change that can be obtained. The germania glass is considerably softer than the undoped silica, while the boron glass is considerably softer than the germania glass.

The difference in viscosity at any temperature between silica and silica germania can be estimated by the expression, $$\text{Log } \zeta_{Si-Ge} - \text{Log } \zeta_{Si} = -0.5\Delta$$

Here, $\zeta$ is the viscosity, and $\Delta$ is $\Delta n/n$ expressed as a percent. For 20% $GeO_2$, $\Delta$ is 1%, so the silica-germania glass is considerably softer than silica. For boron the effect is even more dramatic. A composition of 10 mol % $B_2O_3$/$SiO_2$ has a softening point about 300 degrees less than silica. Other binary systems that would lead to softer glasses include the oxides of phosphorous and aluminum. For example, $P_2O5$/$SiO_2$, again at 10 mol % $P_2O_5$ would have a lower softening temperature by 500 degrees.

Preferably to produce densification and maximum refractive index change by deep UV λ<300 nm lasers, the glass preferably should include a softening component, such as boron. The magnitude of the change is in proportion to the effect of the doped component on softening point. The invention preferably includes softening a silica with softening dopants.

By proper choice of the exposure wavelength, the glass and the waveguide fabrication method, one can maximize the densification contribution to the induced refractive index, and provide a thermally stable waveguide structure.

The densification rate in silica glass obtained by using a 193 nm excimer laser, instead of 248 nm, has been found to be much faster, perhaps by a factor of 5–10. For example, one could achieve an index change of $10^{-4}$ at 193 nm with 330 mJ/cm² pulses at 100 Hz in only 16 minutes.

Direct measurements of the densification rates for silica and binary silica systems doped with $GeO_2$, $B_2O_3$, and $P_2O_5$ was made. The measurement method included an interferometric determination of the optical phase shift produced by a controlled exposure to excimer radiation at 248 nm and 193 nm radiation, respectively. The measurements were done on bulk glass substrate samples of the compositions in Table 2. The samples were formed by flame deposition of soot to form a soot preform body which was then consolidated in a bulk glass body. The crucial feature of this analysis is the use of a finite-element model that permits the extraction of the physically meaningful "unconstrained" densification term $\Delta\rho/\rho$. The physical process of λ<300 nm UV laser light-induced densification resides in this term. The glass densification finite-element model provides for computation of the actual refractive index change induced in the glass with densification.

It has been found convenient to express the behavior of the unconstrained densification as a function of laser exposure in the following power-law form.

$$\frac{\Delta\rho}{\rho} = a\left(\frac{F^2 N}{\tau}\right)^b$$

The term in the brackets, the product of the peak fluence squared and the number of pulses divided by the effective pulse duration is derived from the observed reciprocity of the densification to this product. See Allan et al., SPIE 3578, 16 (1998), incorporated herein by reference in its entirety. The data for each sample were fit to this form and the results are listed below in Table 2. The overall quality of the fit is largely unaffected by this particular choice. What is clear from the data is that the densification is quite different as a function of composition. Again, there is found a strong correlation with the relative "softness" of the glass as measured, for example, by the anneal point.

In the case of the undoped silica the 248 nm-induced densification was 10× smaller than that induced at 193 nm. In the $GeO_2$ sample, it was 40× smaller. So, in addition to the composition dependence of the densification there is also strong laser wavelength dependence.

For this experiment, an exposure of 150 mJ/cm² for $10^5$ of 30 ns pulses were used. This is a dose of 75 (mJ/cm²)² (pulses/$10^6$)/ns. The resulting refractive index changes as a result of 193 nm exposure for the glasses are given in Table 2.

TABLE 2

Comparison of 193 nm Laser-Induced Densification as a Function of Composition.

| Sample designation | Composition % wt. | Prefactor[a] | Anneal Point K | Δn $10^{-4}$ |
|---|---|---|---|---|
| A | $SiO_2$ (dry) | 0.27 | 1423 | — |
| B | $7P_2O_5$—$93SiO_2$ | 2.33 | 1231 | 0.02 |
| C | $20GeO_2$—$80SiO_2$ | 45 | 1323 | 1.4 |
| D | $9B_2O_3$—$91SiO_2$ | 23 | 1073 | 0.7 |
| E | $20B_2O_3$—$80SiO_2$ | 157 | 999 | 4.7 |

This provides that the rate of λ<300 nm UV laser induced densification is a strong function of composition in the binary metal oxide-silica system. The pulsed excimer laser-induced densification rate is shown to increase with metal oxide content. A good correlation was found between the densification rate and the relative "softness" of the glass as indicated by the anneal temperature. The densification rate for all the glasses is also found to be a strong function of the excimer laser wavelength in the order 193 nm>248 nm.

Figure 5:
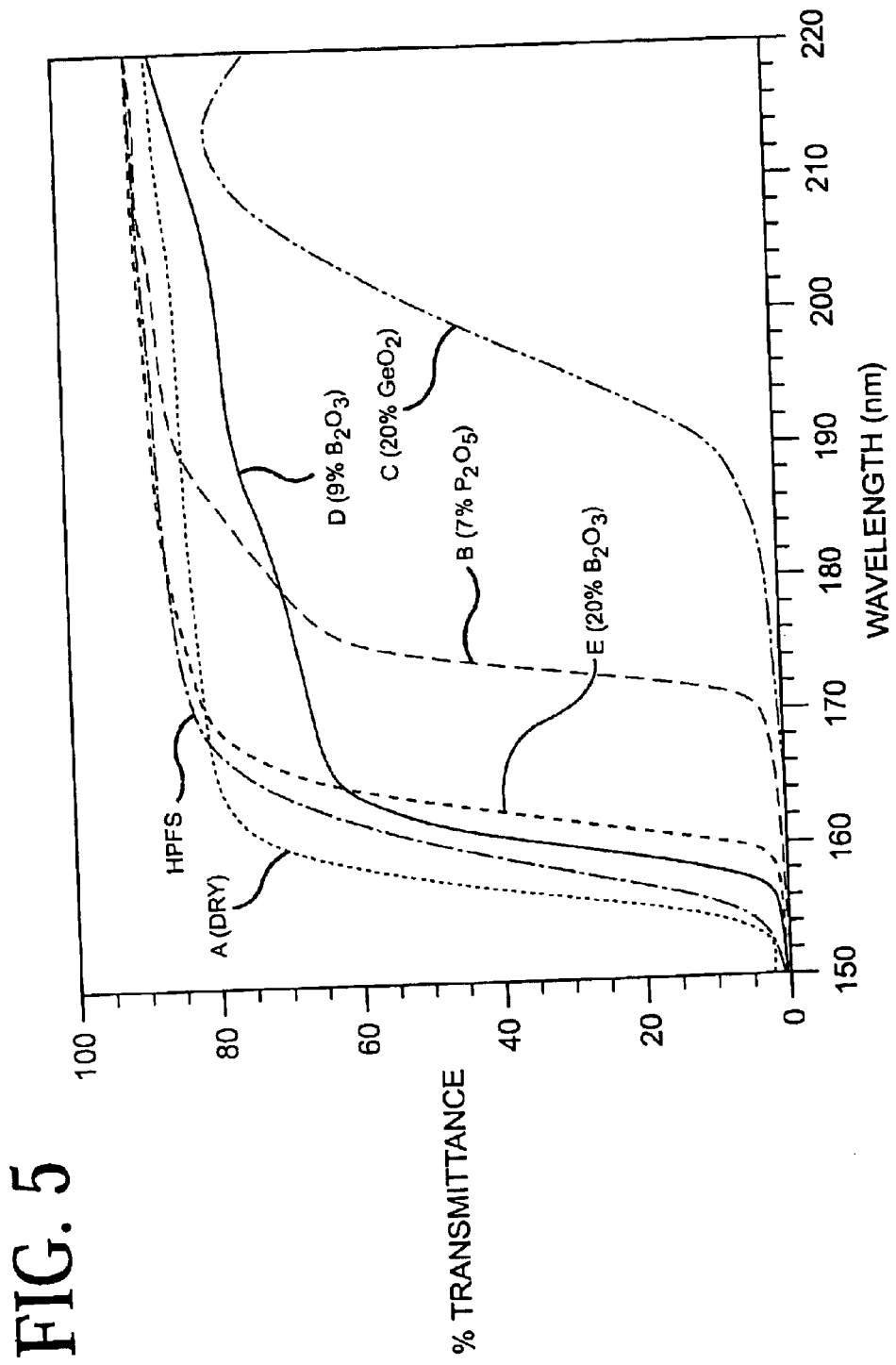
FIG. 5 shows the vacuum UV transmittance vs. wavelength for glasses used in the invention.
Figure 6:
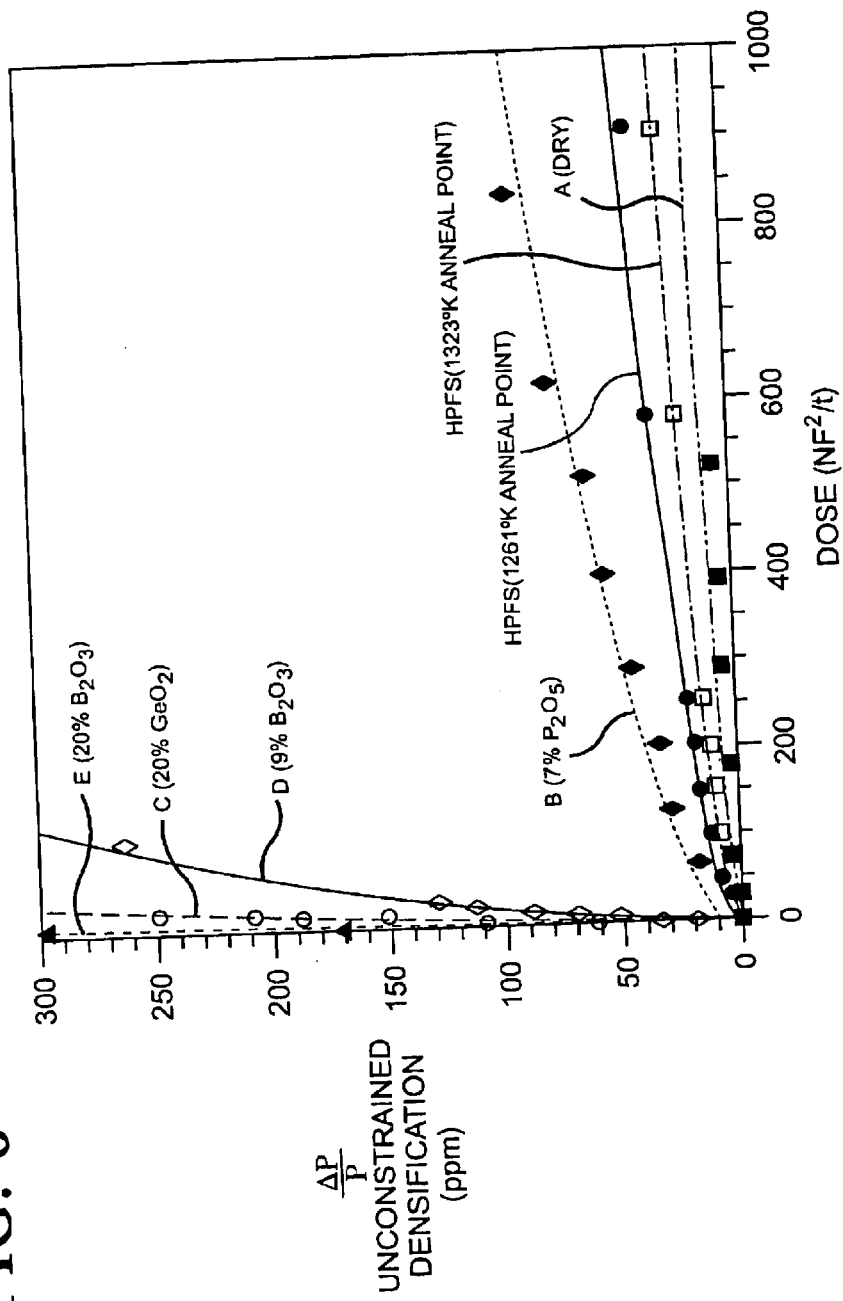
FIG. 6 is a plot of the 193 nm excimer laser induced $\Delta P/P$ vs. DOSE for silica glasses in accordance with the invention.
Figure 6A:
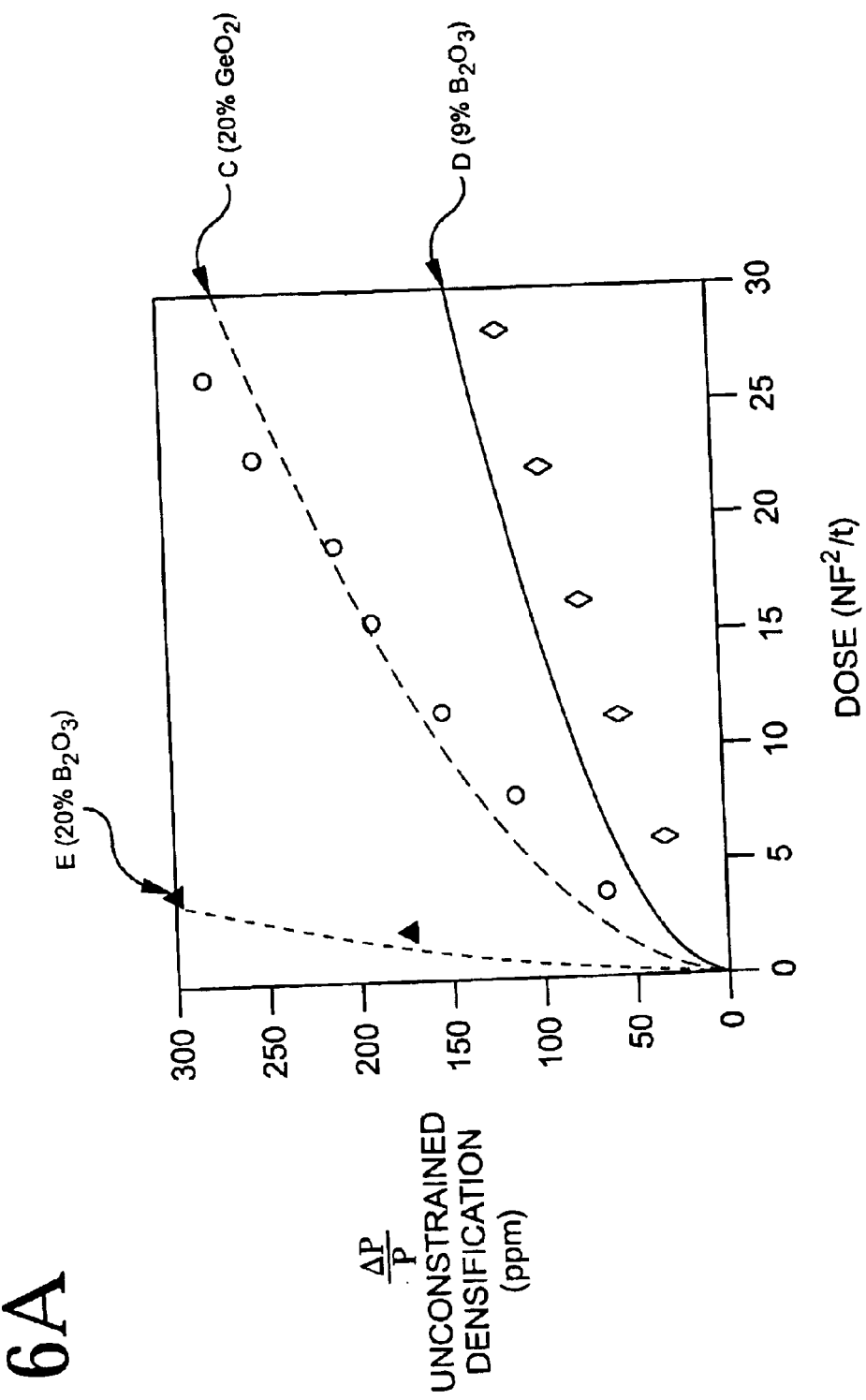
FIG. 6A is an enlargement of part of FIG. 6.

The glasses below were obtained by flame hydrolysis. Corning HPFS® silica is deposited directly from flame and concurrently consolidated with an $SiO_2$ direct soot one step deposition/consolidation. In FIGS. 4–6 HPFS® high purity fused silica is denoted by HPFS. The other glasses were prepared by a soot deposition then a subsequent consolidation into a glass body. In this process a porous soot blank is formed from the flame hydrolysis of a metal precursor. The porous soot blank is then consolidated in a drying atmosphere. Formation of undoped fused silica by this two step process results in a much lower residual OH concentration than HPFS® silica. The lower OH content influences both the optical transmittance below 170-nm as well as the anneal point of the undoped fused silica.

The binary glasses were also prepared by the two-step process where precursors for the various metals (B, P, Ge) were hydrolyzed along with the silica precursor to form a doped porous soot blank which was then consolidated. Vacuum UV transmittance spectra of the various silica-based glasses are shown in FIG. 5.

Unconstrained densification of the 193 nm exposed glasses is plotted against the dose, ($F^2N/\tau$), in FIG. 6. F is the fluence per pulse in mJ/cm², N is the number of pulses in millions, and τ is the integral square pulse duration of the laser in nsec. This definition of dose is obtained from the observed reciprocity of the densification process.

Figure 7:
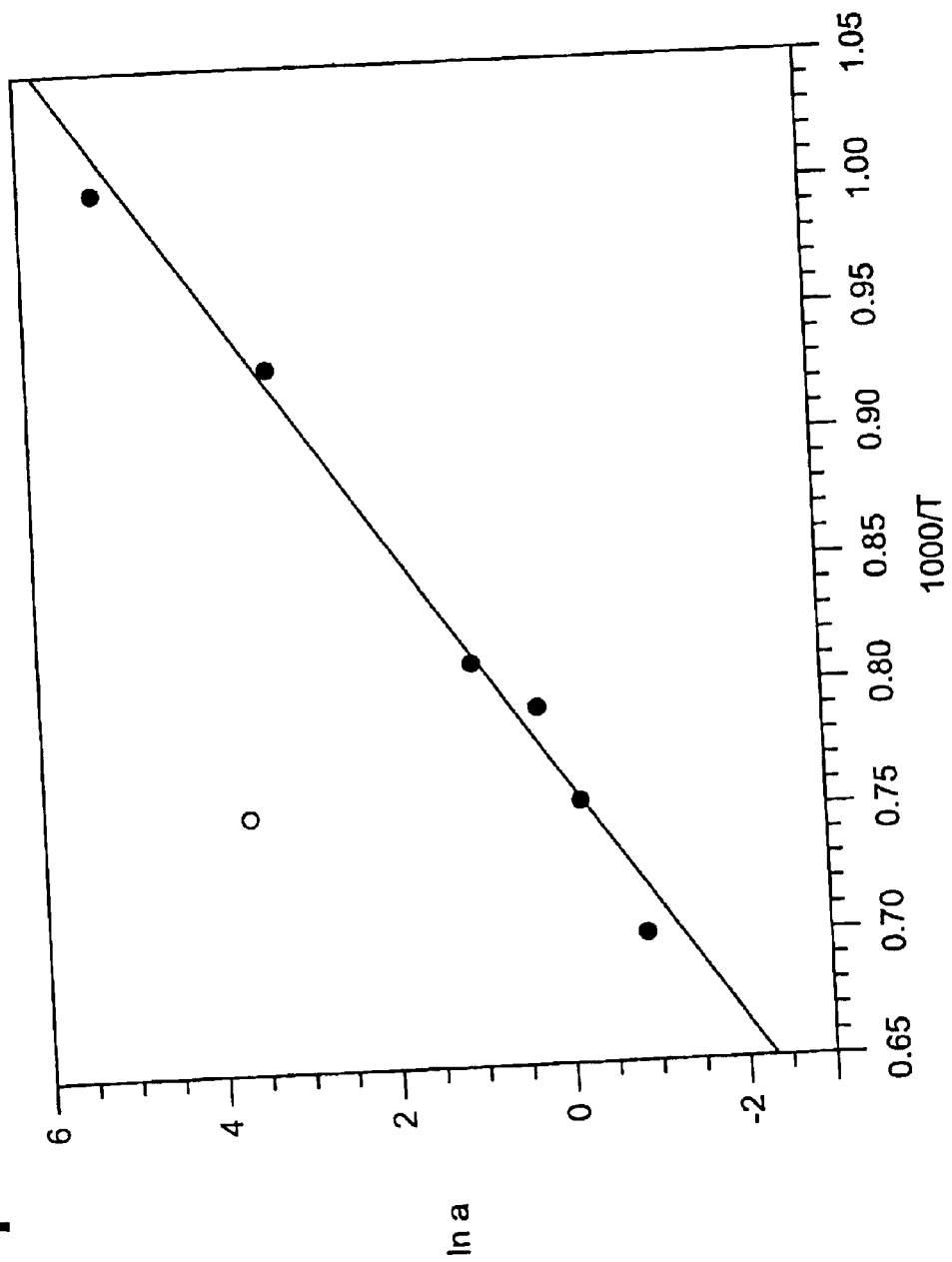
FIG. 7 is a plot of densification (natural log of prefactor a) vs. softness of the glass (reciprocal of the annealing point).

The power law fits used are shown in FIG. 6 for the 193 nm laser induced densification. The values of the prefactor a are listed in Table 3. With the exception of the germanium-doped glass, it is noted that the rate of densification correlates with the "softness" of the glass. That is, the lower the viscosity of the glass at a given temperature, the faster the rate of λ<300 nm laser-induced densification. The temperature corresponding to the anneal point where used to characterize this physical property. The measured anneal points of the glasses are found in Table 3. The relationship between the laser-induced densification and the "softness" of the glass is shown in FIG. 7 where there is plotted ln(a) vs. the reciprocal of the anneal point. Densification is represented by the value of the prefactor a in the equation with b fixed at 0.53. The straight line fit suggests an activated process for the densification where the barrier to the structural rearrangement is 1.7 eV. The actual mechanism of the structure rearrangement to give a more dense structure is not clear, however this result establishes that there is a kinetic factor in the densification mechanism.

It is believed that the germanium-doped silica densification behavior is significantly different from the other binary glasses discussed above. For the 248-nm and 193 nm-excimer laser exposure, the densification process is believed to be a two-photon initiated mechanism since the silica and boron doped and phosphorous doped materials exhibit low absorption at these wavelengths. The germanium-doped glass densifies faster than would be predicted based solely on anneal point. From the VUV spectrum FIG. 5 it is also clear that the absorption of this glass C (20% $GeO_2$ silica) material at 193-nm is higher than the other binaries studied, suggesting that under 193-nm irradiation, the absorption process is linear. The observed anomalously high densification could then be explained by more efficient coupling of light into the glass with the consequence of increased excitation events that eventually lead to densification.

It has been shown that the 193-nm excimer laser-induced densification rate is a strong function of composition. For material with high transmittance at 193-nm (>70%), good correlation is found with the softness of the glass as represented by the anneal point. This correlation was found to be true even within a given composition family.

TABLE 3

Anneal temperatures and prefactors for glasses used.

| Sample Designation | Composition | Anneal Point (K) | Prefactor/fit (R^2) b = 0.53 |
|---|---|---|---|
| A | Dry $SiO_2$ | 1423 | 0.27/0.98 |
| B | 7% $P_2O_5/SiO_2$ | 1231 | 2.33/0.94 |
| C | 20% $GeO_2/SiO_2$ | 1323 | 45.5/0.97 |
| D | 9 wt % $B_2O_3/SiO_2$ | 1073 | 23.2/0.99 |
| E | 20% $B_2O_3/SiO_2$ | 999 | 157/0.98 |

TABLE 4

Dose to achieve 95 ppm Δp/p for 248, 193 and 157-nm. For 248 and 193-nm, dose was calculated based on $NF^2/t$. Dose for the 157-nm exposure was calculated as NF/t.

| Wavelength | Dose |
|---|---|
| 248 | 20000 |
| 193 | 4000 |

As discussed above, one major effect of prolonged deep UV irradiation of fused silica is densification. This densification produces a corresponding refractive index change. The induced refractive index change can for example be 0.0001, and has been found as high as 0.001. This densification-induced refractive index can be used to write patterns and to make, for example, Bragg gratings and waveguide scan paths. Applicants prefer to use below 300 nm UV light such as 193 nm radiation to utilize the densification contribution relative to that originating from induced absorption.

Applicants prefer to use the photosensitive densification by deep UV irradiation (laser λ<300 nm) of soft transparent silica glass materials (anneal point<135°, transmission>70%) to produce light guiding structures and internal patterns. The requirement is that the silica glass material is essentially transparent at the excitation wavelength to insure that the index-altered region can be considered 3-D addressable deep within the glass substrate bulk body. A representative scheme for the exposure is shown in FIG. 1–3 and 8 with optical waveguide densified tunnel devices produced such as in FIG. 9. The waveguiding refractive index change is attributed to densification. In the case of the silica-germania system, it is important to prepare the samples with no oxygen defect that would absorb at the excitation wavelength.

Figure 8:
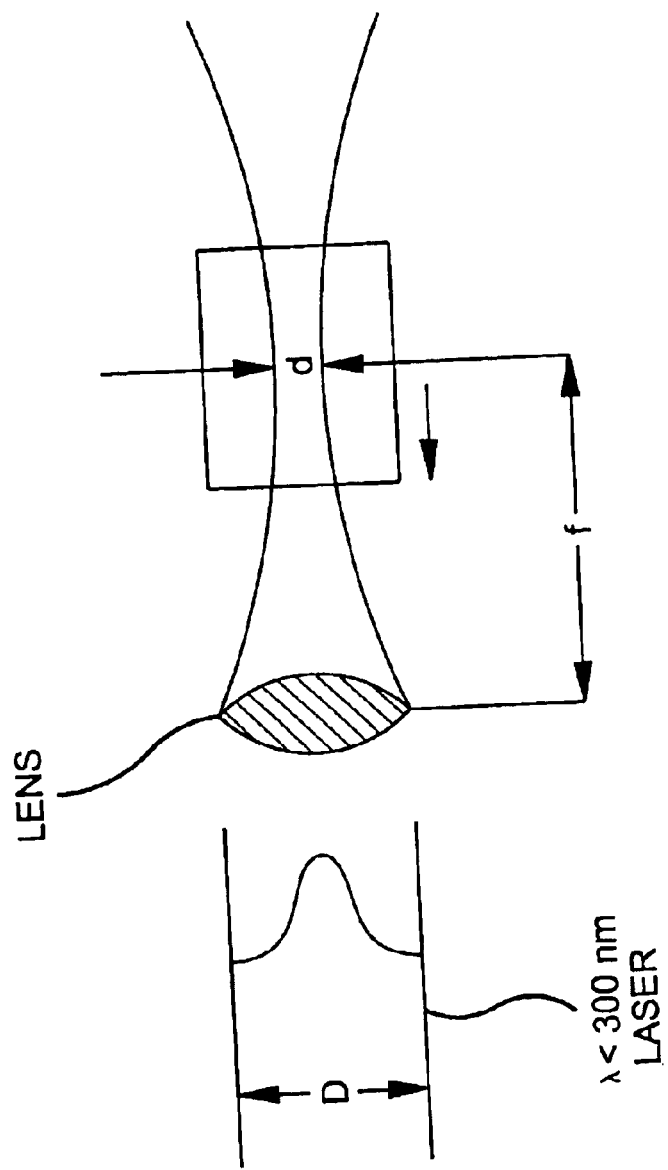
FIG. 8 is a scheme for less than 300 nm laser exposure.

Preferably the exposure system of the invention has sufficiently high numerical aperture, roughly (D/2)/f in FIG. 8, to keep the densification localized to a small enough diameter, d. This latter number should be the order of about 10 $\mu$m (±5 $\mu$m). In addition the exposure levels should be in the range of >100 $mJ/cm^2$ for the order of $10^6$ pulses. This provides beneficial densification and induces measurable index changes.

Figure 9A:
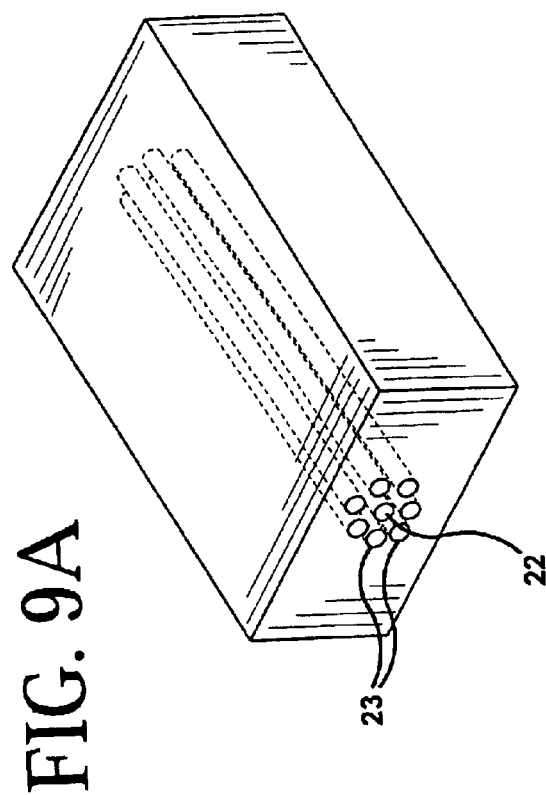
FIG. 9(A)–(E) show optical devices made in accordance with the invention.
Figure 9B:
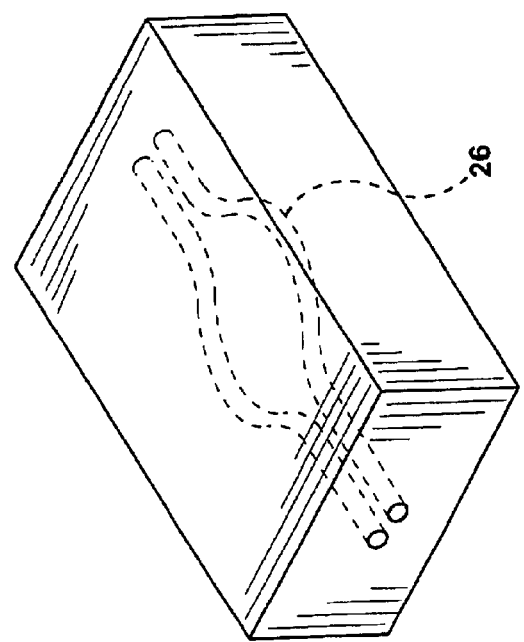
Figure 9C:
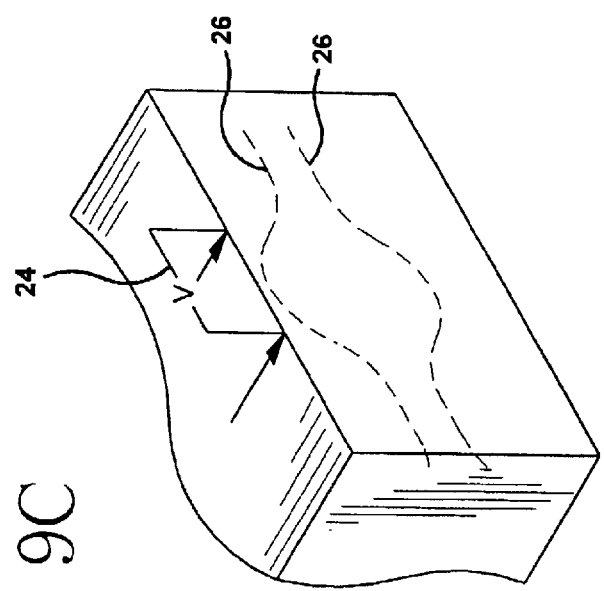
Figure 9D:
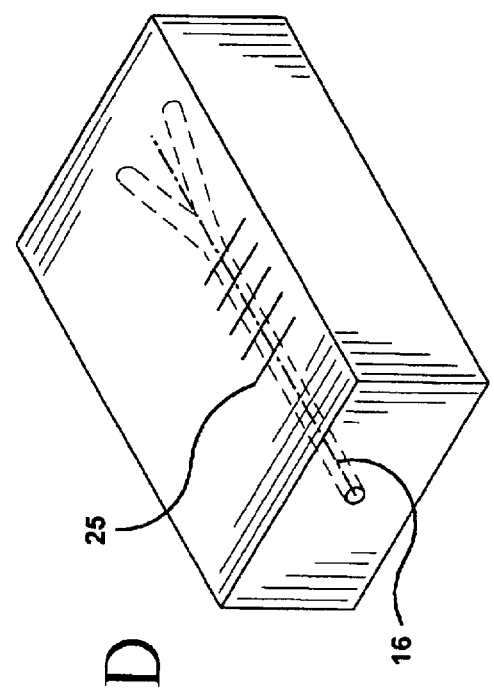
Figure 9E:
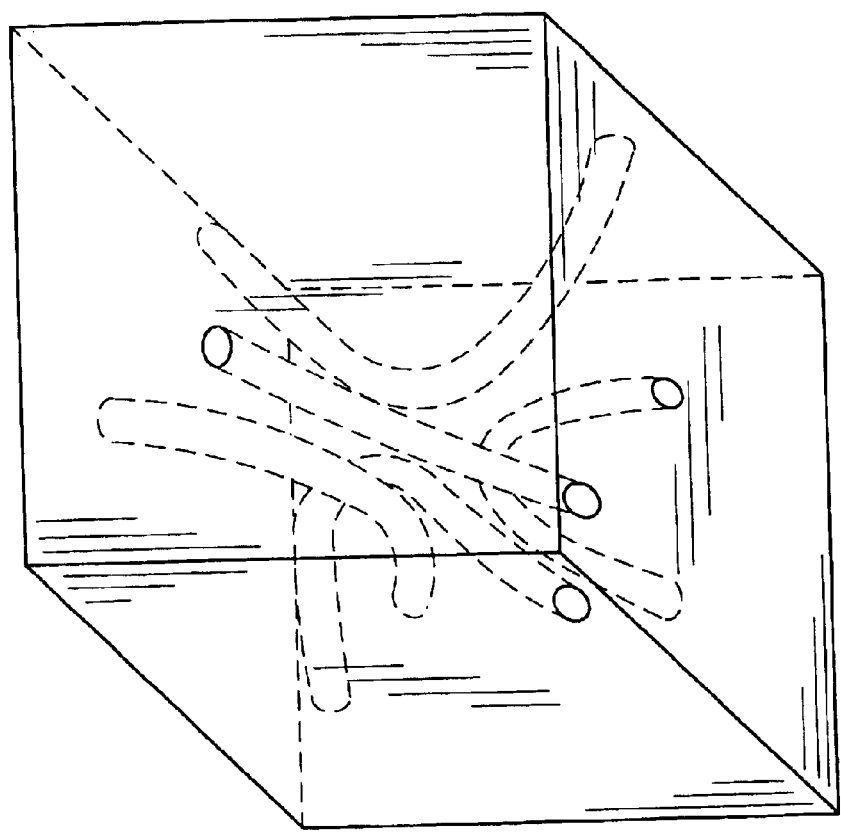

In an embodiment of the invention a single mode waveguide can be written inside a bulk silica glass substrate. A single mode waveguide with a 5 micron radius at a wavelength of 633 nm can be written with a refractive index difference of 0.001. An appropriate densification and induced refractive index change of boron doped soft silica glass Sample D of Table 3 can be induced by a dose of 7500 [($mJ/cm^2$ (M pulses/s)]. A 1 mJ output of a 193 nm excimer laser through a circular 5 mm aperture can be focused by a 200 nm lens to a 10 micron large dimension diameter and provide such a dose with 220,000 pulses. At a 220 Hz repetition rate the exposure would be for about 1000 seconds. With such a dose delivered in a distance corresponding to the confocal distance of the lens (about 1000 microns) the glass substrate sample would be translated on the order of one micron/second to form the scan path. Optical devices of the invention are shown in FIG. 9. A wide variety of optical devices in bulk glass can be made using the presently described materials and methods, for example, an Y-coupler device as shown in FIG. 9(d). The present invention can also be used to make a star coupler having central guide 22 surrounded by a plurality of peripheral guides 23, as shown in FIG. 9(a). The invention can also be used to make a passive Mach-Zehnder coupler including a pair of Mach-Zehnder guides 26, as shown in FIG. 9(b). An active Mach-Zehnder coupler including Mach-Zehnder guides 26 and a thermal (electrically heated) or other type activator 24, as shown in FIG. 9(c), is preferably made using this invention. The present invention can also be used to make Bragg or other types of diffraction gratings in bulk glass, as shown in FIG. 9(d). Waveguide 16 leads to grating lines 25. FIG. 9(e) shows an optical device produced by the inventive method with the glass body having a first exterior side and a second exterior side, said first exterior side lying in a first plane, said second exterior side lying in a second plane, said second plane non-parallel to said first plane, wherein a waveguiding core tunnels from an input at the first exterior side to an output at the second exterior side. The devices of FIG. 9 are produced with the inventive densification method with glass body having a planar exterior base side, wherein waveguiding cores tunnel in planes non-parallel to the planar base side. The devices of FIG. 9 are produced with the inventive densification method by forming a first raised refractive index waveguiding core tunnel path, a second raised refractive index waveguiding core tunnel path, and a third raised refractive index waveguiding core tunnel path, wherein the third tunnel path is in a plane separate from the first tunnel path and the second tunnel path. Making of the FIG. 9 devices includes forming a first raised refractive index waveguiding core tunnel path and an adjacent second raised refractive index waveguiding core tunnel path wherein guided light is coupled from said first core tunnel path to said second core tunnel path. Making of the FIG. 9 devices includes forming a wavelength division multiplexer for multiplexing a plurality of optical wavelength channels by forming a plurality of waveguiding core tunnel inputs for separately inputting the plurality of optical wavelength channels, forming a multiplexing coupling region for multiplexing the inputted channels, and forming an output waveguiding core tunnel for outputting the multiplexed inputted channels. Line spacings of 0.5 μm are possible using this invention.

It will be understood that the above described preferred embodiments of the present invention are susceptible to various modifications, changes, and adaptations, and the same are intended to be comprehended within the meaning and range of equivalents.

Further, although a number of equivalent components may have been mentioned herein which could be used in place of the components illustrated and described with reference to the preferred embodiments, this is not meant to be an exhaustive treatment of all the possible equivalents, not to limit the invention defined by the claims to any particular equivalent or combination thereof. A person skilled in the art would realize that there may be other equivalent components presently known, or to be developed, which could be used within the spirit and scope of the invention.

What is claimed is:

1. A method of writing a light guiding structure comprising the steps of:
   providing a glass substrate formed from a substantially germanium-free silica-based material, wherein the glass substrate has not been subjected to a hydrogen loading step; and
   focusing a beam output from a below 300 nm laser within the substantially germanium-free silica-based material of the provided glass substrate while translating the focused beam relative to the substrate along a scan path at a scan speed effective to densify and induce an increase in the refractive index of the substantially germanium-free silica-based material along the scan path relative to that of the unexposed material while incurring substantially no laser induced breakdown of the material along the scan path,
   thereby forming an optical waveguide having a core formed from the densified substantially germanium-free silica-based material; and a cladding surrounding the core, the cladding being formed from the substantially germanium-free silica-based material.

2. A method as claimed in claim 1, wherein said glass substrate has a substantially homogenous composition.

3. A method as claimed in claim 1, wherein said glass substrate has a substantially homogenous refractive index.

4. A method as claimed in claim 3 wherein said glass substrate has an optical index homogeneity of $\Delta n \leq 5$ ppm.

5. A method as claimed in claim 1, wherein the core of the optical waveguide has an interior non-surface corepath part that is at least 1 cm away from the exterior surfaces of the glass body.

6. A method as claimed in claim 1, wherein the glass substrate has a thickness at least one thousand times the thickness of the core of the optical waveguide.

7. A method as claimed in claim 1, wherein the substantially germanium-free silica-based material is an undoped silica material.

8. A method of making a three dimensional structure within an interior of a glass body, said method comprising the steps of:
   providing a glass body, said glass body having an interior, said interior having a homogeneous, substantially germanium-free composition and refractive index, wherein the glass body has not been subjected to a hydrogen loading step,
   providing a lens and a laser beam output from a 193 nm excimer laser or a 248 nm excimer laser,
   coupling said laser beam into said lens to form a converging focused laser beam having an intensity at its focus sufficient to increase the refractive index of a volume of the substantially germanium-free composition of the interior of the provided glass body, and
   positioning said focus inside said interior of the provided glass body and controlling relative motion between said focus and said glass body,
   wherein the increased refractive index volume forms a waveguiding core within the homogeneous, germanium-free composition of said glass body, the waveguiding core being completely clad by the homogeneous, germanium-free composition.

9. A method as claimed in claim 8, wherein said glass body has a first exterior side and a second exterior side, said first exterior side lying in a first plane, said second exterior side lying in a second plane, said second plane being non-parallel to said first plane, wherein said waveguiding core traverses the glass body from an input at said first exterior side to an output at said second exterior side.

10. A method as claimed in claim 8, said glass body having a planar exterior base side, wherein said waveguiding core traverses the glass body in a plane non-parallel to said planar base side.

11. A method as claimed in claim 8, wherein said method includes forming a first raised refractive index waveguiding densified core path in the glass body, a second raised refractive index waveguiding densified core path in the glass body, and a third raised refractive index waveguiding densified core path in the glass body, wherein said third core is in a plane separate from said first core and said second core.

12. A method as claimed in claim 8, wherein said composition is homogeneously doped with a glass softening dopant.

13. A method as claimed in claim 8, wherein said interior of said glass body has an index homogeneity of $\Delta n \leq 5$ ppm.

14. A method as claimed in claim 8, wherein said laser beam has a wavelength $\lambda_{Laser}$, and said glass body has an internal transmission of at least 50%/cm at $\lambda_{Laser}$.

15. A method as claimed in claim 8, wherein the difference between the refractive index of the waveguiding core and the refractive index of the unexposed interior of the glass body is at least $1 \times 10^{-5}$ at 633 nm.

16. A method as claimed in claim 8, wherein the difference between the refractive index of the waveguiding core and the refractive index of the unexposed interior of the glass body is at least $1 \times 10^{-4}$ at 633 nm.

17. A method as claimed in claim 8, wherein the laser beam is output from a 193 nm excimer laser.

18. A method as claimed in claim 8, wherein the laser beam is output from a 248 nm excimer laser.

19. A method as claimed in claim 8, wherein said method includes forming a first raised refractive index waveguiding densified core in the glass body and a second raised refractive index waveguiding densified core in the glass body, wherein said first core is optically coupled to said second core.

20. A method as claimed in claim 8, wherein the core of the waveguide has an interior non-surface corepath part that is at least 1 cm away from the exterior surfaces of the glass body.

21. A method as claimed in claim 8, wherein the glass body has a thickness at least one thousand times the thickness of the core of the waveguide.

22. A method as claimed in claim 8, wherein the substantially germanium-free silica-based composition is an undoped silica composition.

* * * * *